United States Patent [19]
Campbell

[11] Patent Number: 5,325,947
[45] Date of Patent: Jul. 5, 1994

[54] POWER TRANSFERRING APPARATUS

[76] Inventor: Jacob A. Campbell, 3494 Welty Rd., Lucas, Ohio 44843

[21] Appl. No.: 999,313

[22] Filed: Dec. 31, 1992

[51] Int. Cl.$^5$ .................. F16D 13/06; F16D 13/16; F16D 43/20
[52] U.S. Cl. .................. 192/54; 192/76; 192/93 R; 192/107 T
[58] Field of Search .................. 192/54, 76, 77, 78, 192/93 R, 107 T, 105 BA, 105 BB

[56] References Cited

U.S. PATENT DOCUMENTS

| | | | |
|---|---|---|---|
| 1,806,340 | 5/1931 | Francis | 192/54 |
| 2,036,586 | 4/1936 | Le Porin | 192/105 BA X |
| 2,251,588 | 8/1941 | Gilbert | 192/54 |
| 3,204,737 | 9/1965 | Anner | 192/54 X |
| 3,817,360 | 6/1974 | Bianchi | 192/78 |
| 4,645,050 | 2/1987 | Ingenhoven | 192/78 X |
| 4,850,466 | 7/1989 | Rogakos et al. | 192/78 |

FOREIGN PATENT DOCUMENTS

1081875 12/1954 France .................. 192/105 BA

*Primary Examiner*—Richard M. Lorence
*Attorney, Agent, or Firm*—Roger D. Emerson

[57] ABSTRACT

An apparatus for transferring power includes a shaft, a pair of pawls, and an outer member. The shaft has a first end which is connected to an electric motor and a second end which is operatively associated with the pawls. As the shaft turns, the pawls are forced outwardly against a non-circular interior surface of the outer member. As the pawls contact the inner surface of the outer member, they transfer rotational energy from the rotating shaft to the outer member, causing it to also rotate. When power to the electric motor is shut off, the shaft stops turning. The pawls are spring biased inwardly toward the shaft. When the shaft stops turning, the pawls move inwardly toward the shaft and are not connected any longer to the interior surface of the outer member. The outer member is free to spin freely even though the motor is stopped.

1 Claim, 8 Drawing Sheets

POWER TRANSFERRING APPARATUS

BACKGROUND OF THE INVENTION

1. Field of Invention

This invention pertains to the art of mechanisms for transferring power, and more specifically to mechanisms allowing a power producing source to be intermittently shut on and off while allowing energy generated by such power source to be stored in a rotating flywheel or the like.

2. Description of the Related Art

It is not uncommon in the mechanical arts for one end of a shaft to be driven, such as by an electric motor while the other end is connected to a device which is freely rotating. For example, an automobile utilizes a clutch which allows a power source (the engine) to be selectively coupled or uncoupled from a second end of the shaft (the drive shaft). Another common example is the machining industry, wherein a machine uses an electric motor to start some rotational action, such as in a drill press. At different times during a machining process, the electric motor is shut off but it is desired that the rotating portions of the machining apparatus continue to rotate.

The present invention contemplates a new and improved power transferring apparatus which is simple in design, effective in use, and which overcomes some of the difficulties of the prior art while providing better and more advantageous overall results.

SUMMARY OF THE INVENTION

In accordance with the present invention, a new and improved power transferring power apparatus is provided which allows a power source to be selectively connected and disconnected to a rotating shaft.

More particularly, in accordance with the invention, the innovative apparatus includes a shaft, a pair of shoes, and an outer member. The shaft has first and second ends. The shoes are operatively associated with the second end of the shaft. The shoes are displaceable in a radial direction from a radially inward first position to a radially outward second position. The shoes are moved radially inwardly and outwardly in response to rotation by the shaft. The outer member has an interior surface which defines a recess. The shoes are located within the recess. The radially outward surface of the shoes selectively engage the interior surface of the outer member, thereby transferring rotational energy from the shaft and the shoes to the outer member. When the shoes are displaced radially inwardly, so that their outer surfaces no longer engage the interior surface of said outer member, the outer member freely rotates on said shaft through bearings, even though said shaft and shoes are no longer rotating.

In accordance with another aspect of the invention, the shaft comprises engaging means to engage said shoes, the engaging means being a square extension at the second end of the shaft. The square extension preferably has rounded corners.

According to a still further aspect of the invention, the shoes are biased radially inwardly towards an axial centerline of said shaft by means of springs. The springs connect the shoes together and can be elastically deformed when the shoes move radially outwardly upon rotation of the shaft. When the torque load is removed from the shaft, the shoes are pulled radially inwardly toward each other and the axial centerline by means of the springs. According to a further aspect of the invention, the recess of the outer member is elliptically shaped. The elliptical shape of the recess allows the rotating shoes to become wedged against an interior surface of the recess and transfer the rotational energy from the shaft and the shoes to the outer member.

According to a still further aspect of the invention, a collar is received on the shaft. The collar is fixedly attached to said outer member and rotates therewith. Said collar is adapted to receive a power transferring mechanism, such as a belt, allowing rotational power from said shaft to be transferred to said collar through the engagement of the shoes. When the shoes are not engaged with the interior surface of the outer member, the outer member and collar rotate freely while the shaft and shoes do not rotate.

One advantage of the present invention is the provision of a new power transferring apparatus which provides improvements over prior art devices.

Another advantage of the invention is the provision of a simple, inexpensive mechanism which is reliable and provides a significant and valuable service to its user.

Another advantage of the present invention is its durable construction. The inventive apparatus has few parts. It is a simple, effective mechanism which is believed to be manufacturable at a lower cost than other devices performing the same function.

Another advantage of the present invention is its applicability to a wide variety of industries. For example, it is believed the inventive apparatus could be used in the machine tool industry to transfer rotational energy from an electric motor to a flywheel, in the automotive industry to engage or disengage the engines of four wheel drive vehicles from their drivetrains, in the lawn mower industry to provide a simple way to disengage the of a powered, self-propelled lawn mower from the motor, and other such applications. Still other advantages and benefits of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
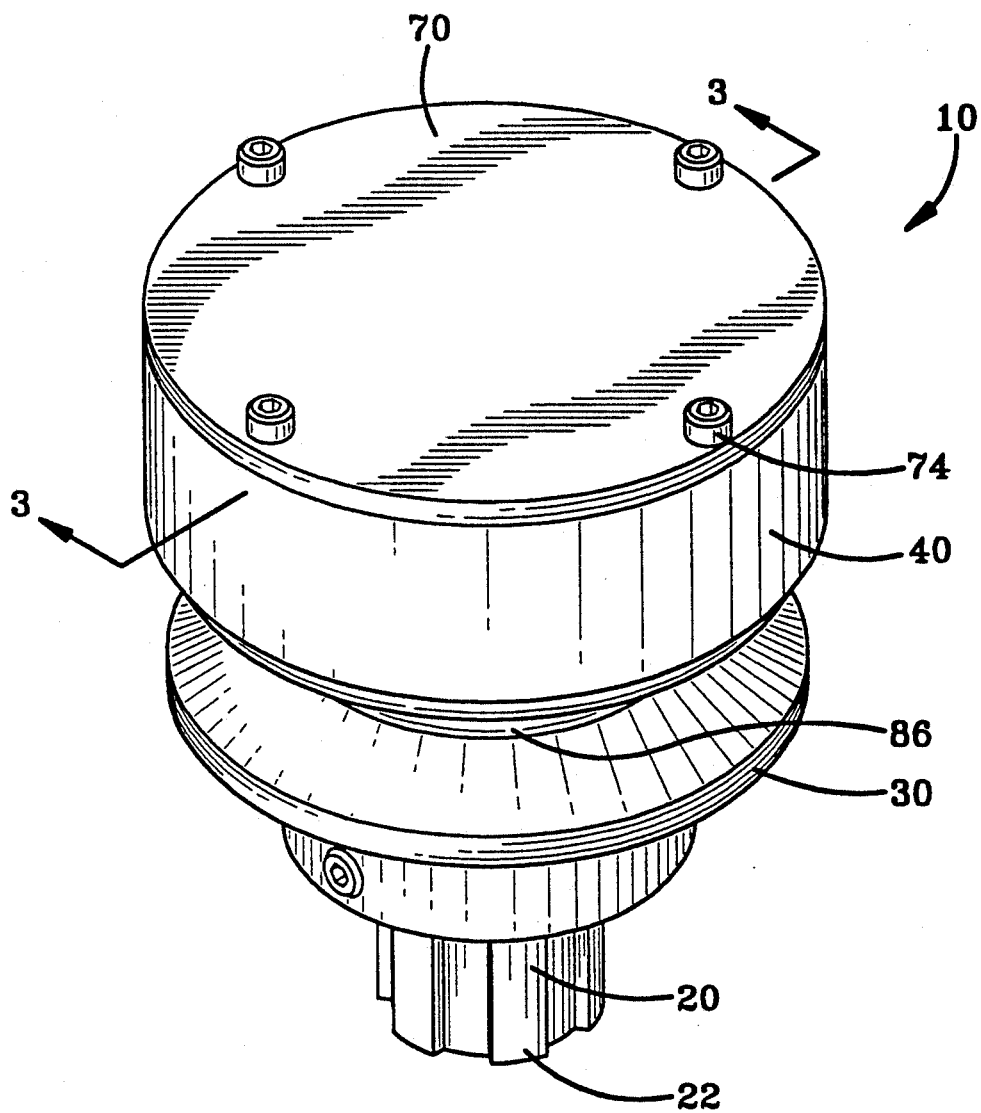
FIG. 1 is a perspective view of the assembled inventive apparatus.
Figure 2:
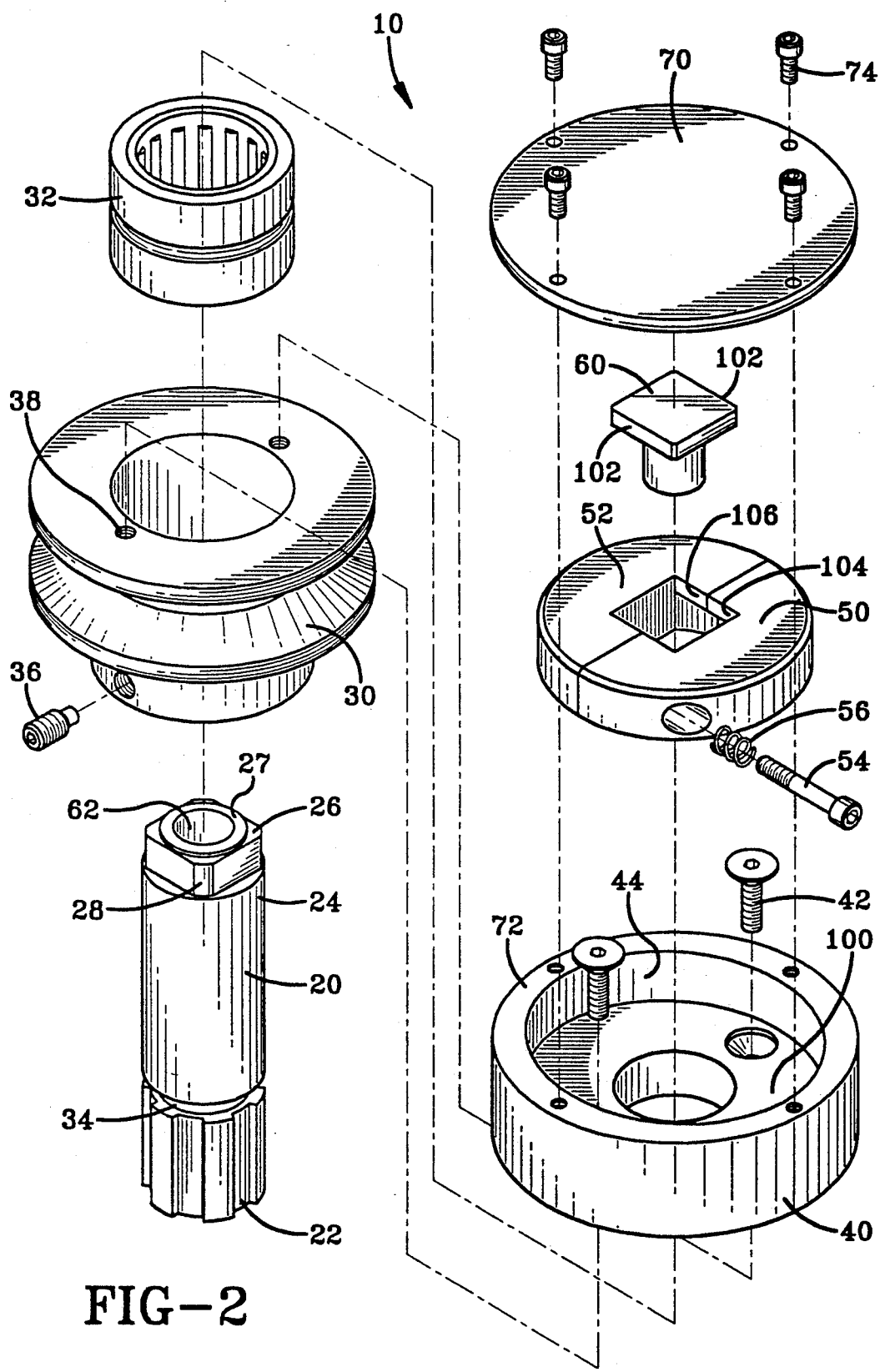
FIG. 2 is an exploded view of the inventive apparatus.
Figure 3:
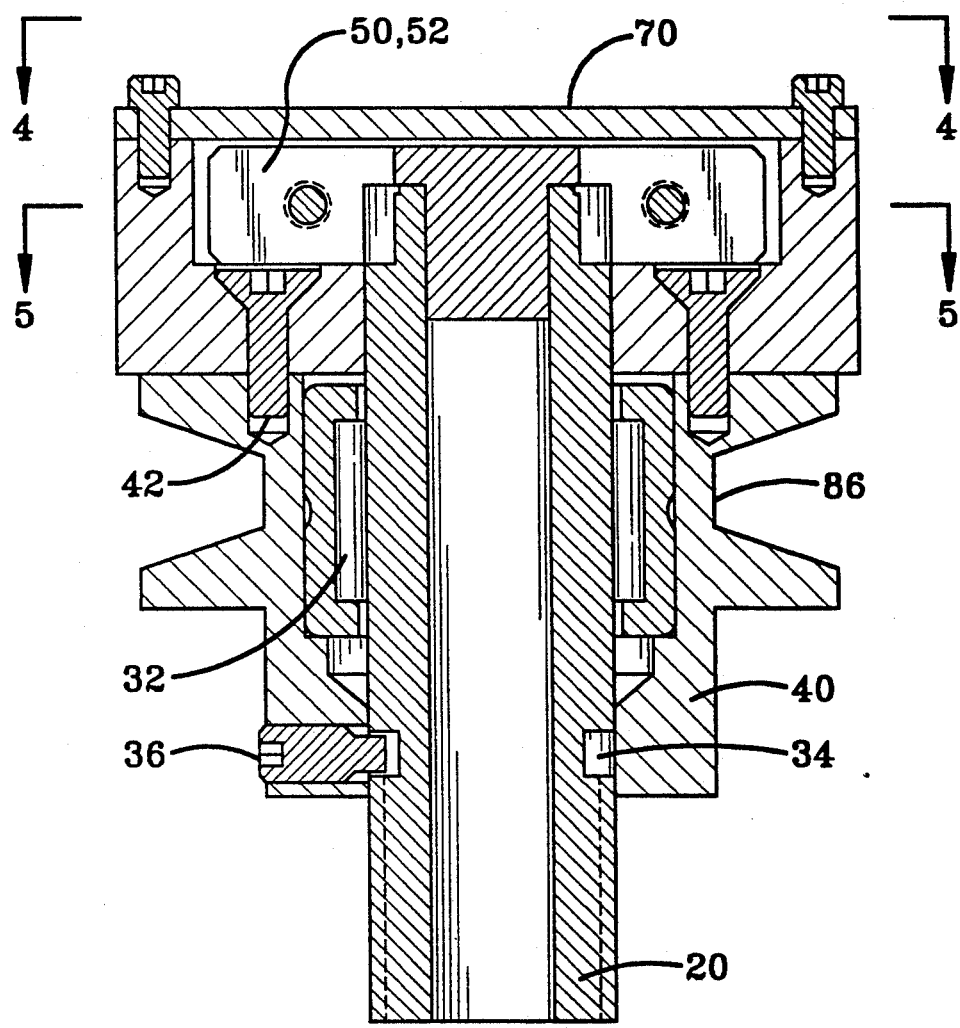
FIG. 3 is a side cross-sectional view of the inventive apparatus taken along line 3—3 of FIG. 1.

Referring now to the FIGURES wherein the showings are for purposes of illustrating a preferred embodiment of the invention only and not for purposes of limiting the same, FIGS. 1–5A disclose one embodiment of the invention. With particular reference to FIG. 2, the apparatus 10 includes a shaft 20, a collar 30, an outer member 40, a first shoe 50, and a second shoe 52.

The shaft 20 has a first end 22 and a second end 24. The first end 22 of the shaft 20 is operatively associated with and connected to a power source (not shown). In the preferred embodiment, this power source is an electric motor and many of the benefits of the invention are available through the use of an electric motor power source. The second end 24 of the shaft 22 has an engaging means at its end. In the preferred embodiment, the engaging means is a square extension 26. The square extension 26 has rounded corners 28 and a washer-like undercut 27. In the preferred embodiment the undercut 27 is 0.15". The function of the extension 26 and rounded corners 28 will be described later.

The collar 30 is rotatably received onto shaft 20 by means of bearing 32. The collar 30 is secured in position relative to shaft 20 by means of set screw 36 which is received into slot 34.

Figure 4:
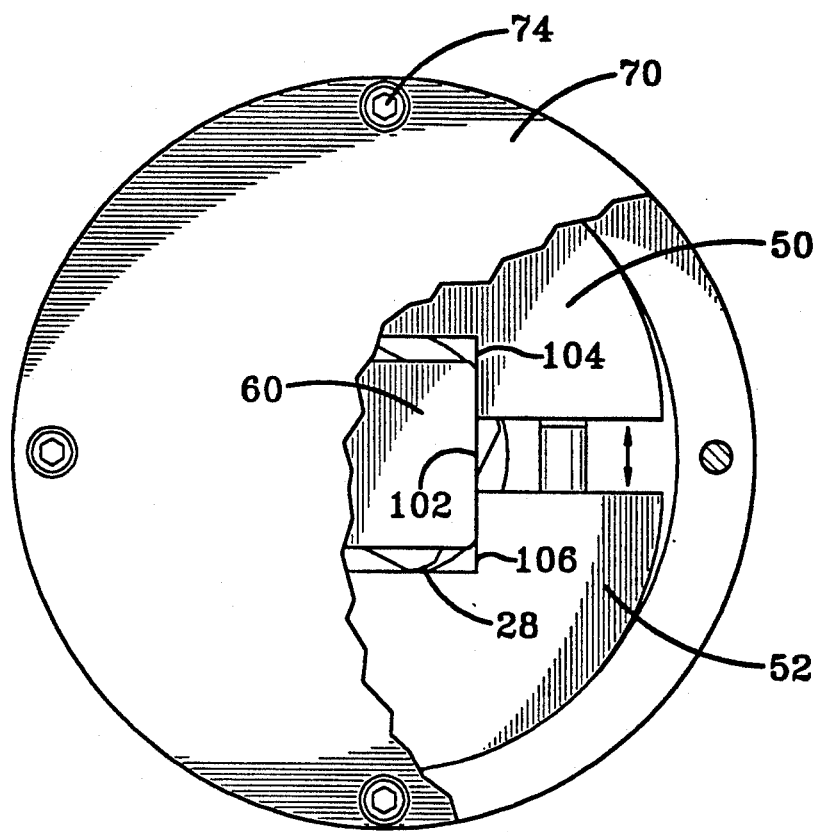
FIG. 4 is a end view of the inventive apparatus, in partial cross-section, taken along line 4—4 of FIG. 3.
Figure 5:
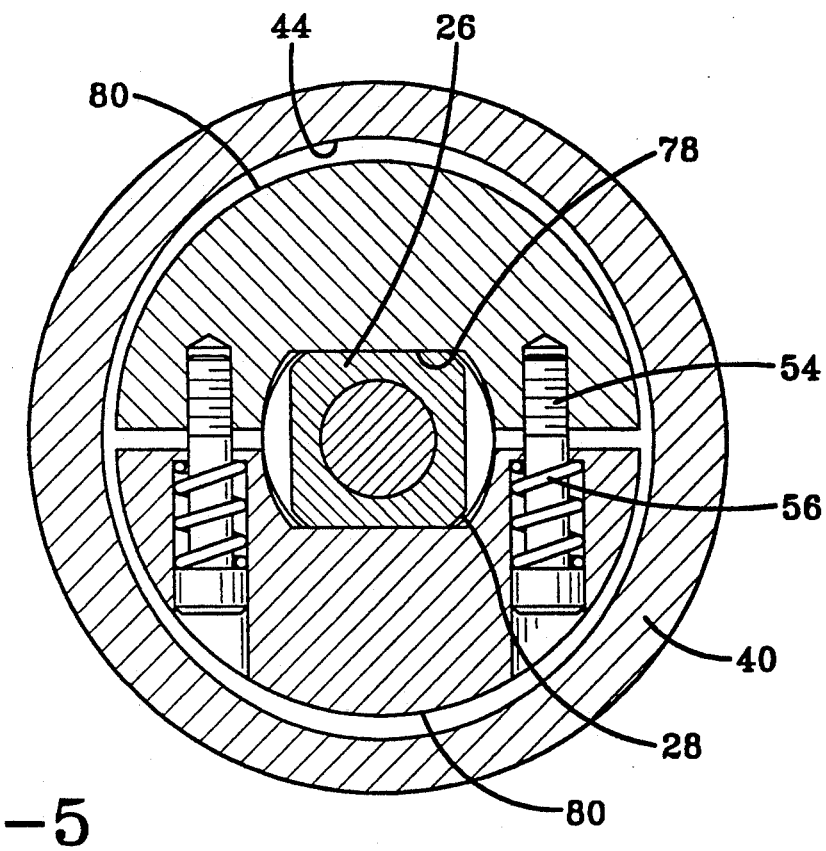
FIG. 5 is a cross-sectional end view of the inventive apparatus taken along line 5—5 of FIG. 3 with the shoes shown in a non-engaging relationship to the outer member.
Figure 5A:
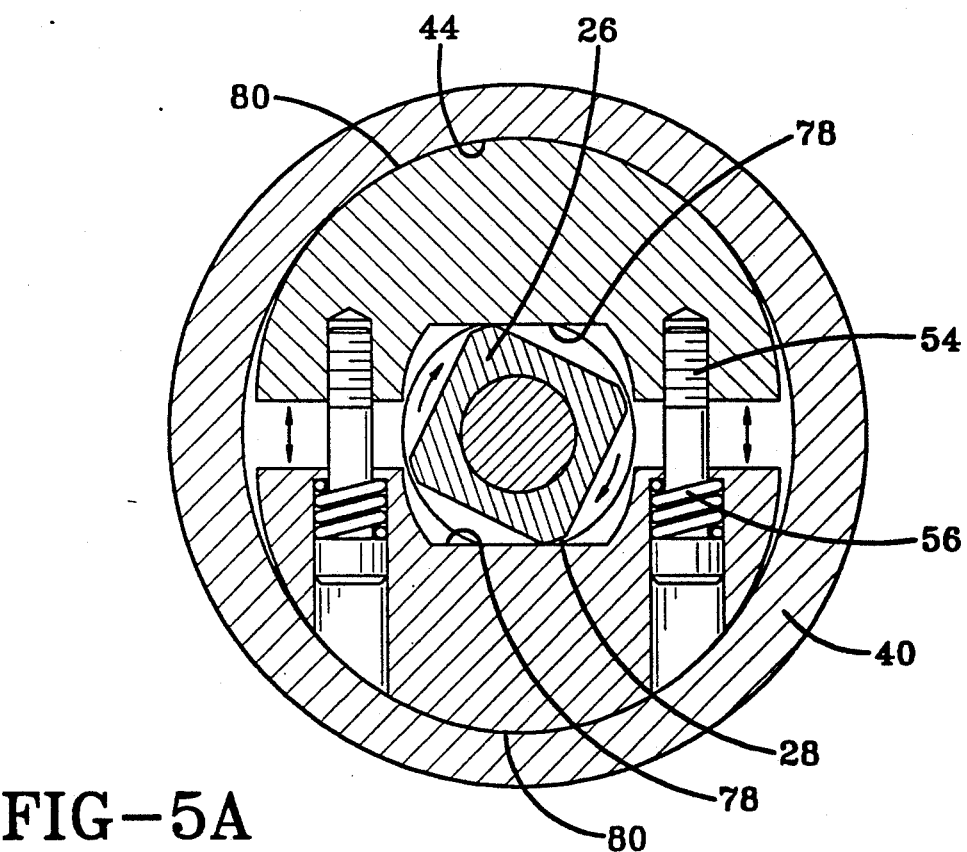
FIG. 5A is a cross sectional end view of the inventive apparatus taken along line 5—5 of FIG. 3 with the shoes being in an engaging relationship with the outer member.

In the disclosed embodiment, outer member 40 is fixedly connected to collar 30 by means of screws 42 which are received into holes 38. The outer member 40 has an interior surface 44 which forms a recess 100 into which fits first and second shoes 50, 52. With reference to FIGS. 4, 5, and 5A, one of the most important aspects of the invention is the non-circular shape of recess 100. Because of its non-circular shape, the shoes 50,52 can be brought into operative association with the interior surface 44 of the recess 100. When the shoes 50,52 move to a radially outwardly second position, the outer surface of each shoe 50,52 wedges against the interior surface 44 of recess 100 so that the shoes 50,52 and the outer member 40 rotate together.

First shoe 50 fits together with second shoe 52 by means of screws 54. Note that screws 54 include springs 56 which biases the first shoe 50 radially inwardly toward the second shoe 52. In one embodiment shown in FIG. 5 and 5A, the springs 56 are internal of outward surfaces of the shoes 50,52.

Another important element of the invention is guide 60. Guide 60 fits within hole 62 at the second end 24 of the shaft. The guide 60 performs the important function of maintaining movement by the shoes 50,52 along a straight line. As is best seen in FIG. 4, the guide 60 has lateral edges 102 which mesh with lateral edges 104,106 of the shoes 50,52. The lateral edges 104,106 of the shoes 50,52 slide relative to the lateral edge 102 of the guide 60 but keep along a line parallel to the lateral edge 102.

Cover plate 70 is secured onto a second end 72 of the outer member by means of four screws 74.

With reference to FIGS. 1–5A, and especially FIGS. 5 and 5A, the operation of the inventive apparatus will be described. It is often desirable for a power source to be intermittently connected and disconnected while allowing certain other parts of an apparatus to spin freely. For example, when one wishes to shift gears in an automobile, a clutch pedal is depressed, temporarily disconnecting the power source (the engine) from the drive train and wheels, which are allowed to continue to spin freely.

In the machining industry, it is often desirable for rotational energy generated by an electric motor to be stored in a flywheel or similar device, allowing the electric motor to be shut off. One reason why it is important that the electric motor be intermittently disconnected to the rotating flywheel is the problem of electrical potential being generated when the electric motor turns. If a rotating flywheel is allowed to remain connected to an electric motor which is shut off, the rotating brushes within the electric motor can generate significant electrical potential which can damage the motor or other equipment. Therefore, a mechanism such as is described herein can allow the rotational energy of a flywheel to be stored while decoupling an electric motor from the flywheel.

With particular reference to FIGS. 5 and 5A, an important aspect of the operation of the apparatus 10 will now be described. The embodiment disclosed is especially directed to a application where an electric motor is attached to a first end 22 of shaft 20. When the electric motor is turned on, it applies torque to the shaft 20, causing it to rotate. As the shaft 20 turns through a small arc, the rounded corners 28 of the extension 26 push against radially inward surfaces 78 of the first and second shoes 50, 52.

In FIG. 5, the shoes 50,52 are shown in a radially inward first position. In this position, the shoes do not contact the outer member 40. In FIG. 5A, the shoes 50,52 are shown in radially outwardly second position in which they do contact the outer member 40.

As the shaft 20 turns through a small arc, the shoes 50, 52 are forced radially outwardly, bringing a radially outward surface 80 of the shoes 50, 52 into operative association, through a frictional fit, with interior surface 44 of the recess 100 of the outer member 40. Because the recess 100 is non-circular, the shoes 50,52 wedge against interior surface 44, as shown in FIG. 5A. Because the shoes 50,52 are rotating with the shaft 20, the shoes 50,52 transfer rotational energy to the outer member 40, which begins to spin.

It is important to understand that the shaft 20 never makes a full rotation relative to the shoes 50,52. Instead, the shaft rotates only through the small arc illustrated in FIGS. 5 and 5A, relative to the shoes 50,52. As the shaft 20 continues rotating, it rotates the shoes 50,52 along with it, so there is actually very little rotational movement between the shaft 20 and the shoes 50,52.

As the outer member 40 begins to spin, rotational energy can be transferred from it through means of slot 86. In one preferred embodiment, one end of a belt (not shown) is received into slot 86. The belt is connected at its other end to a flywheel. As the outer member 40 spins, it transfers rotational energy from the outer member 40 through the slot 86, to the belt. At its other end, the belt rotates a flywheel. Therefore, while the outer member 40, belt, and flywheel are all spinning, the motor (not shown) can be shut off, thereby stopping the torque load on the shaft 20. When the torque load on the shaft 20 is eliminated, the shoes 50,52 are pulled by springs 56 back into a radially inwardly first position, as shown in FIG. 5. In this position, the outer member 40 can continue to spin freely relative to the shaft 20.

With reference to FIG. 5, in the situation illustrated there, the torque load has been removed from the shaft 20 and it has stopped turning, allowing the springs 56 to pull first and second shoes 50,52 together. When the shoes 50,52 are in this first position, the radially outward surface 80 of the shoes 50,52 do not touch the interior surface 44 of the recess 100 of the outer member 40.

Figure 6:
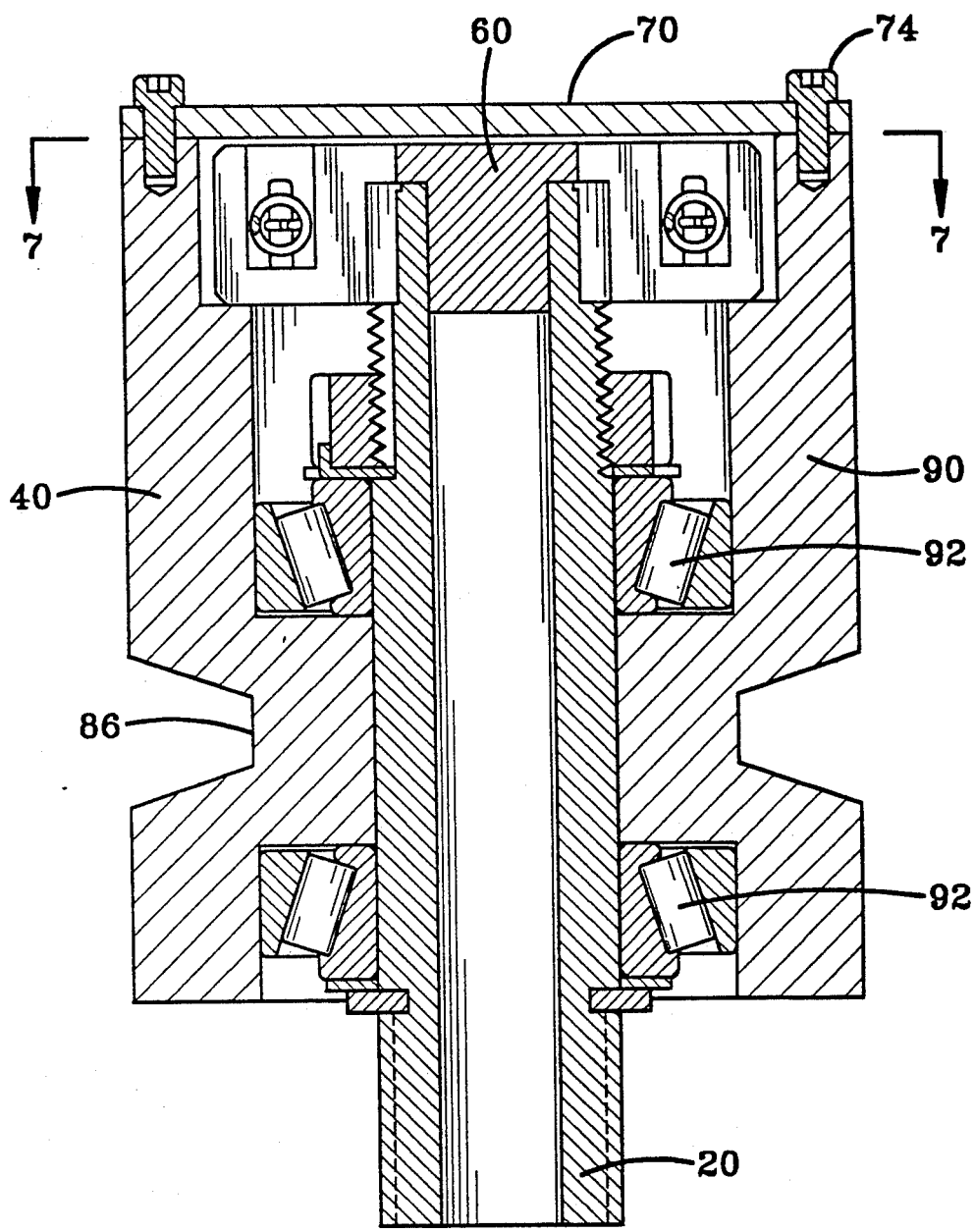
FIG. 6 is a cross-sectional side view of an alternate embodiment of the invention.
Figure 7:
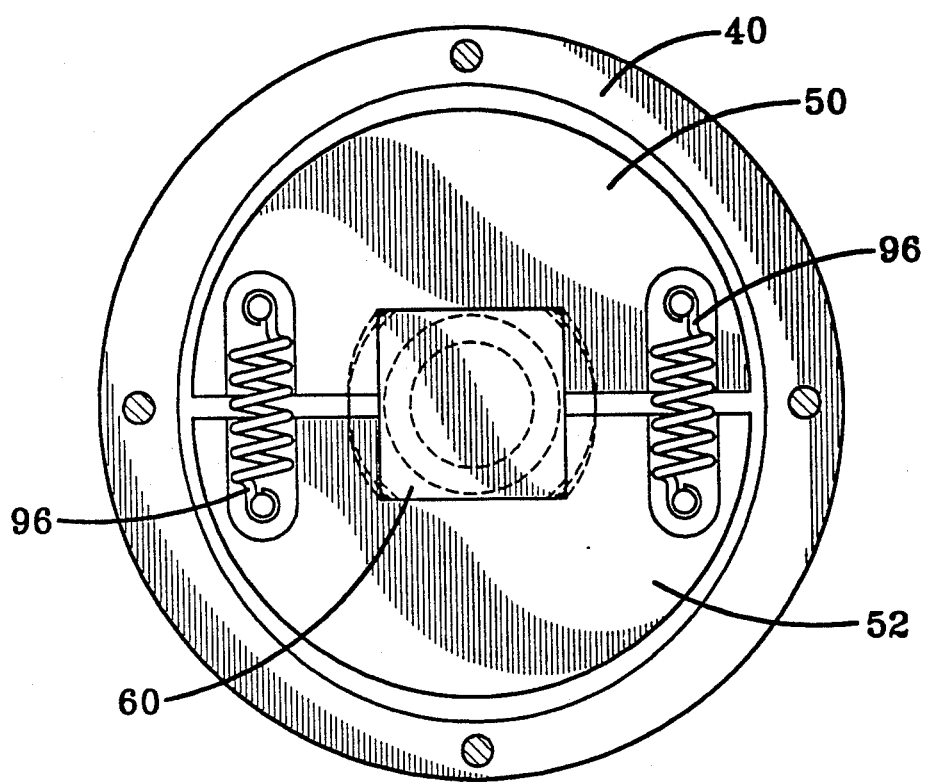
FIG. 7 is a cross-sectional end view of the inventive apparatus taken along line 7—7 of FIG. 6; and, FIG. 8 is a perspective view of one application of the inventive apparatus showing the apparatus used in association with a wheel as might be used with a powered lawn mower.
Figure 8:
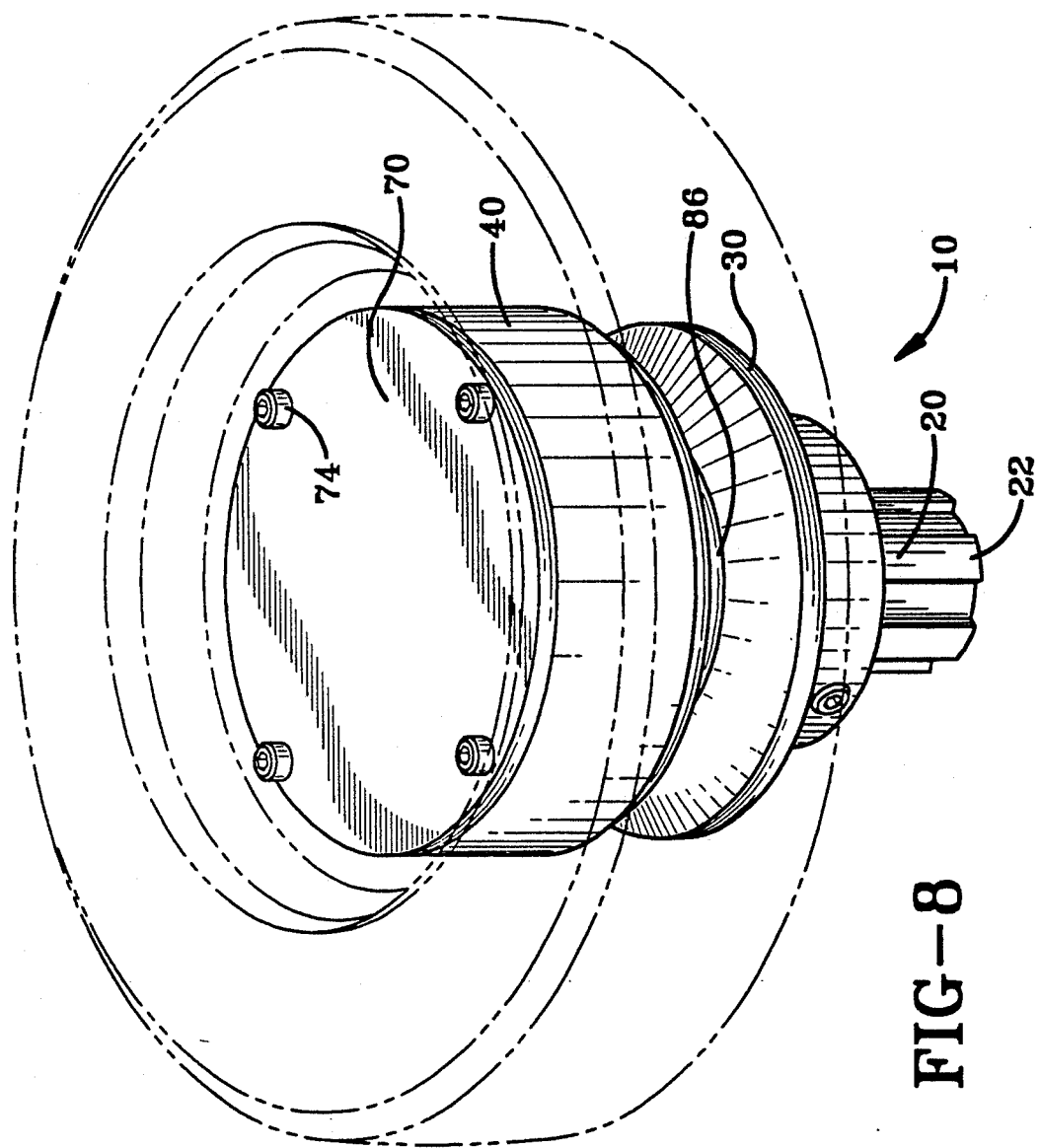

With reference to FIG. 6, an alternate embodiment of the invention is shown. In this embodiment, the collar 30 and the outer member 40 are effectively combined into a single member 90. In addition, in this embodiment, roller bearings 32 shown in FIGS. 2 and 3 have been replaced by other bearings 92. One preferred embodiment includes needle bearings. embodiment of the shoes 50,52 is disclosed. With reference FIGS. 5 and 5A, the shoes 50,52 are joined together to spring 56 and screw 54. In the preferred embodiment shown in FIG. 7, the spring 96 is on the outer surface of the shoes 50,52. This embodiment is preferred due to its perceived ease in maintenance. With reference to FIG. 8, one application of the inventive apparatus is shown such as might be used with a wheel or with a powered lawn mower.

The invention has been described with reference to a preferred embodiment. Obviously, modifications and alterations will occur to others upon a reading and understanding of this specification. It is intended to include all such modifications and alterations in so far as they come within the appended claims or the equivalents thereof.

Having thus described the invention, it is now claimed:

1. An apparatus for transferring power, said apparatus comprising:

a shaft, said shaft having first and second ends, said shaft having an axial centerline;

a pair of shoes, said shoes being in contact and in operative association with said second end of said shaft, said shoe having radially inward and radially outward surfaces, said shoes being radially outwardly displaceable between first and second positions, in said first position said shoes being radially inward and in said second position said shoes being radially outward;

an outer member, said outer member having an interior surface which defines a recess, said recess of said outer member being non-circular, said shoes being located within said recess, said radially outward surface of said shoes engaging said interior surface of said outer member and transferring rotational energy from said shaft to said outer member in said shoes or in said second position, said outer member freely rotatable when said shoes are in said first position; and, a guide, said guide having lateral edges, said lateral edges of said guide being adjacent lateral edges of said shoes and restraining said shoes to move along a line, said guide further comprising a first end, said first end of said guide fitting into said second end of said shaft.

* * * * *